(12) United States Patent
Ikeuchi

(10) Patent No.: US 7,609,982 B2
(45) Date of Patent: Oct. 27, 2009

(54) RZ-DPSK OPTICAL RECEIVER CIRCUIT

(75) Inventor: Tadashi Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/270,655

(22) Filed: Nov. 10, 2005

(65) Prior Publication Data

US 2007/0047971 A1 Mar. 1, 2007

(30) Foreign Application Priority Data

Aug. 25, 2005 (JP) ............................ 2005-245067

(51) Int. Cl.
*H04B 10/06* (2006.01)
*H04B 10/04* (2006.01)

(52) U.S. Cl. ..................... 398/214; 398/202; 398/203; 398/204; 398/207; 398/212

(58) Field of Classification Search ................ 398/202, 398/203, 212, 204, 207, 214
See application file for complete search history.

(56) References Cited

U.S. PATENT DOCUMENTS

| 5,012,494 | A | | 4/1991 | Lai et al. | |
|---|---|---|---|---|---|
| 5,251,054 | A | * | 10/1993 | Lynn | 398/202 |
| 5,596,441 | A | * | 1/1997 | Sakakibara et al. | 398/205 |
| 7,259,901 | B2 | * | 8/2007 | Parsons et al. | 359/237 |
| 7,333,732 | B2 | * | 2/2008 | Domagala | 398/155 |
| 2004/0081470 | A1 | | 4/2004 | Griffin | |
| 2005/0175125 | A1 | * | 8/2005 | Krivokapic | 375/340 |
| 2007/0001755 | A1 | * | 1/2007 | Schrodinger | 327/558 |

FOREIGN PATENT DOCUMENTS

| JP | 04-078235 | 3/1992 |
|---|---|---|
| JP | 2000-059300 | 2/2000 |
| JP | 2001-251250 | 9/2001 |
| JP | 2004-227688 | 8/2004 |
| JP | 2004-254242 | 9/2004 |
| JP | 2005-100574 | 4/2005 |

* cited by examiner

*Primary Examiner*—Ken N Vanderpuye
*Assistant Examiner*—Daniel G Dobson
(74) *Attorney, Agent, or Firm*—Hanify & King P.C.

(57) ABSTRACT

A received RZ-DPSK signal is guided to an interferometer. The interferometer comprises a 1-bit delaying element in an upper arm. A balanced photodiode converts a pair of optical signals output from the interferometer into electrical signal. A high-pass filter, which has a cut-off frequency equal or approximately equal to the symbol rate of transmission data, filters the signal output from the balanced photodiode. A BPSK demodulator circuit demodulates the output signal of the high-pass filter.

10 Claims, 15 Drawing Sheets

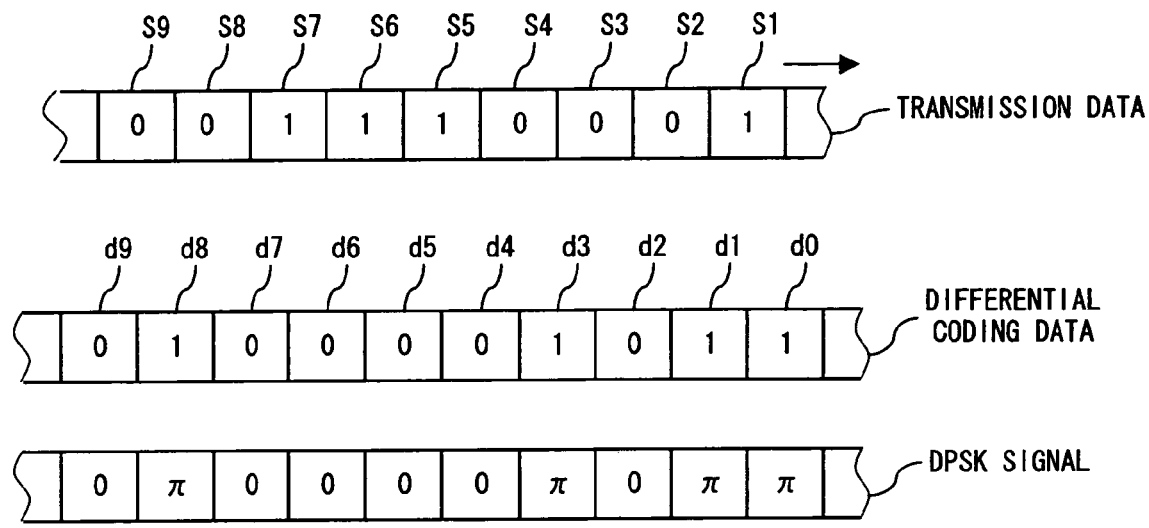
F I G. 4A
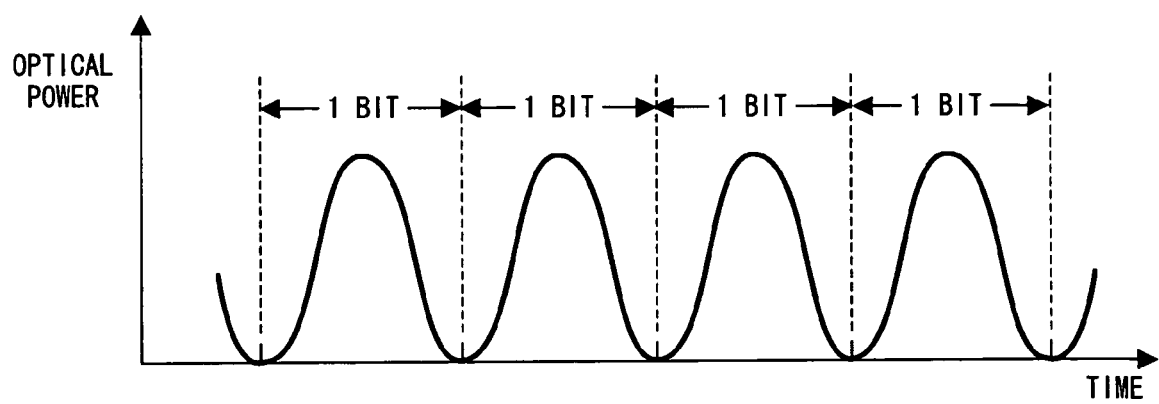
F I G. 4B

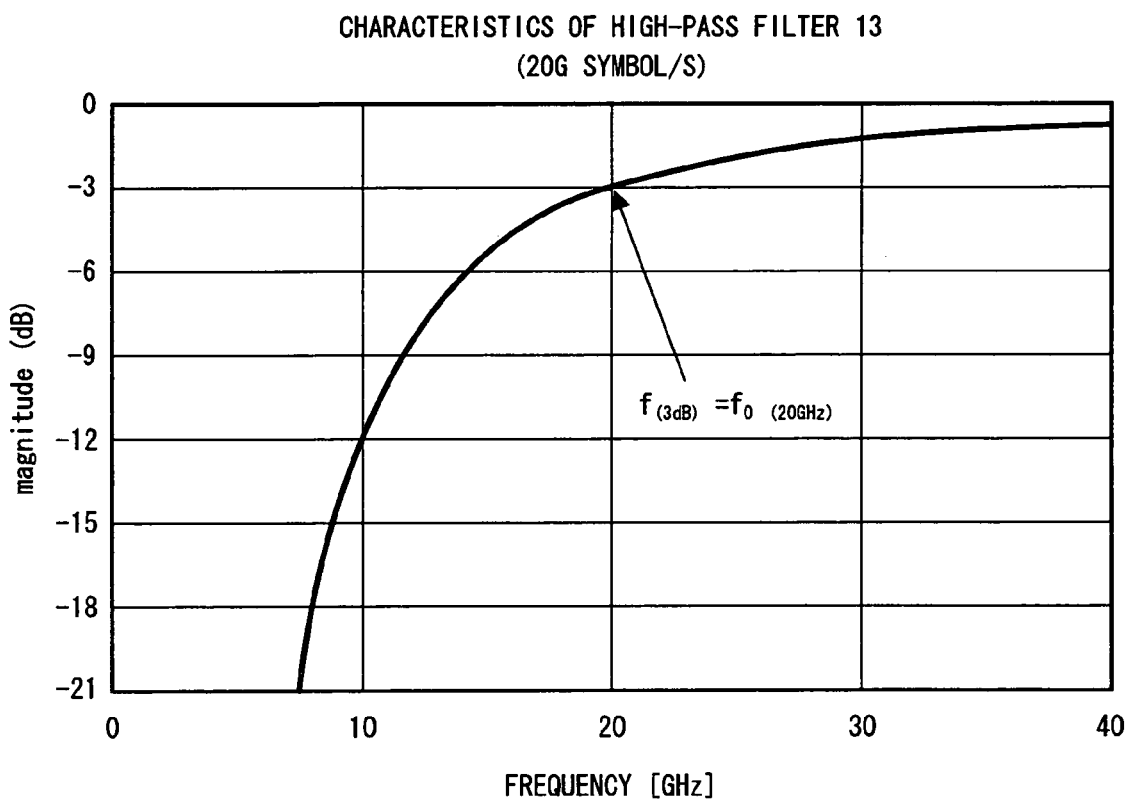
F I G. 6

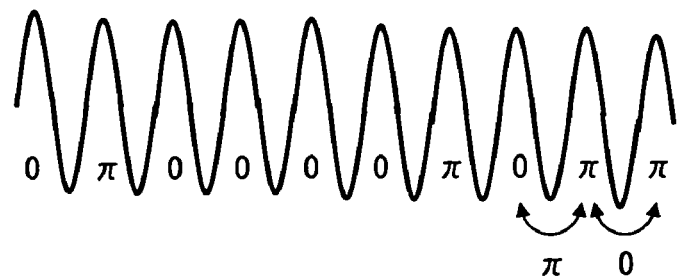
F I G. 7 A
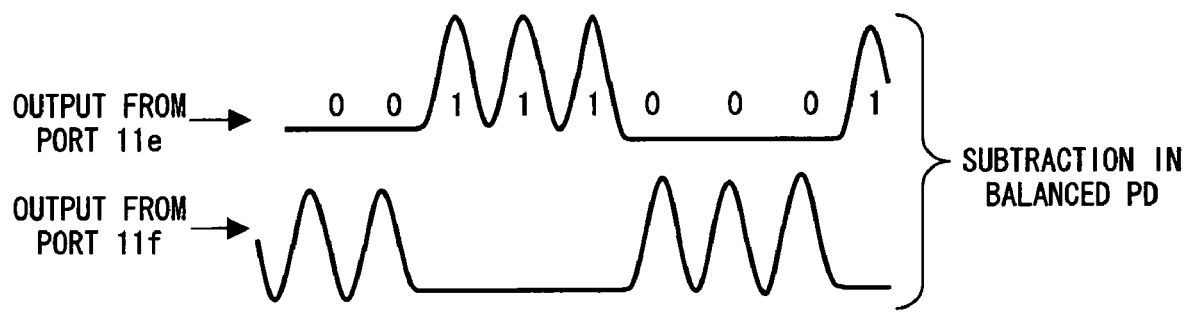
F I G. 7 B
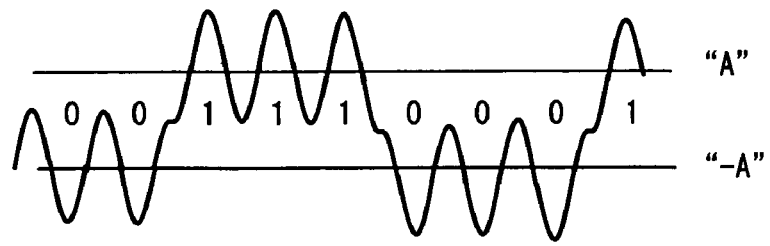
F I G. 7 C

RZ-DPSK SIGNAL
(PD OUTPUT)

EYE PATTERN

HIGH-PASS FILTER OUTPUT
(NRZ AMPLITUDE MODULATION COMPONENT IS REMOVED BY HIGH-PASS FILTER)
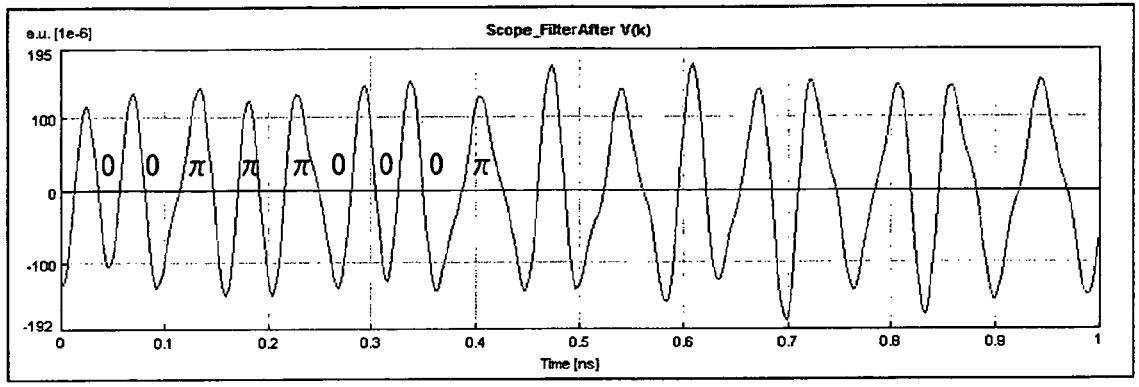
F I G. 9A
EYE PATTERN
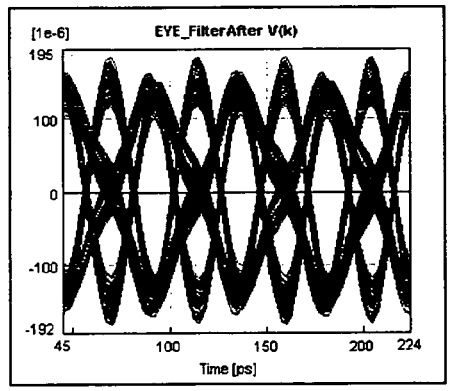
F I G. 9B

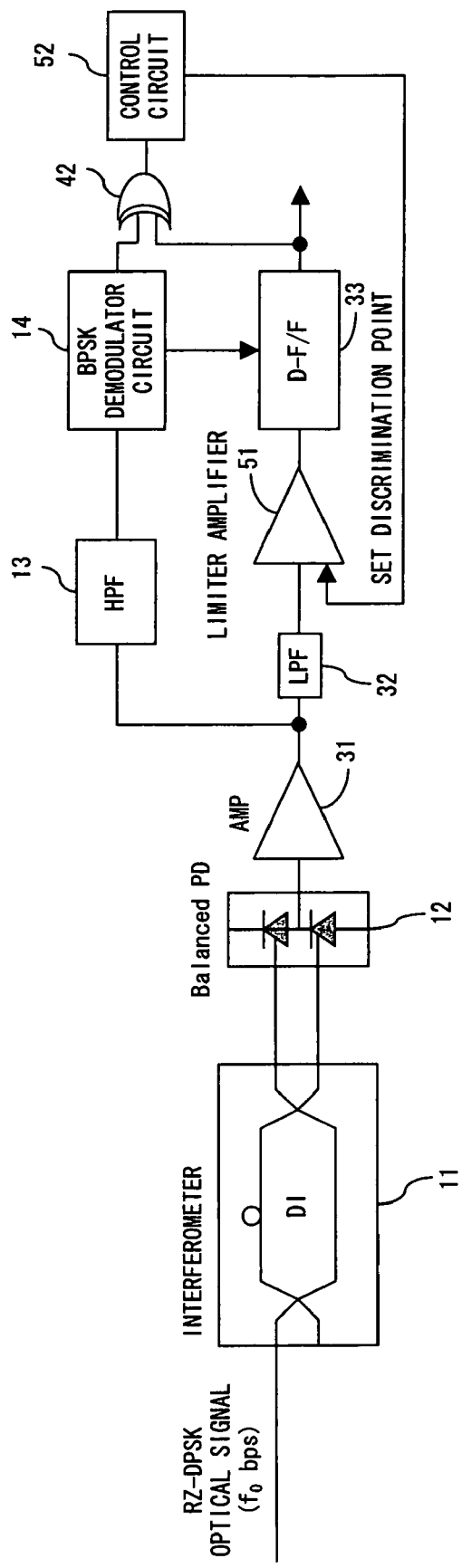
F I G. 14

RZ-DPSK OPTICAL RECEIVER CIRCUIT

BACKGROUND OF THE INVENTION

1. Field of the Invention

The present invention relates to an optical receiver circuit for receiving an RZ-DPSK optical signal and for demodulating it.

2. Description of the Related Art

As a technology for transmitting signals in an optical transmission system, phase modulation has been put to practical use widely. In the phase modulation, data is transmitted by shifting a phase of a carrier wave in accordance with data to be transmitted. In Binary Phase Shift Keying (BPSK) modulation, for example, "θ" and "θ+π" are assigned to data "0" and "1" in each bit, respectively. In Quaternary Phase Shift Keying (QPSK) modulation, "θ", "θ+π/2", "θ+π" and "θ+3π/2" are assigned to each symbol comprising 2-bit data, "00", "01", "11" and "10", respectively. Here, "θ" is an arbitrary phase. A receiver apparatus can regenerate the transmitted data by detecting the phase of the received signal.

When increasing transmission speed or distance of a transmission path, deterioration of an optical S/N ratio becomes a problem in the receiver apparatus.

In recent years, research and development of Differential Phase Shift Keying (DPSK) modulation have been making progress as phase modulation, which enables to improve receiver sensitivity. In the DPSK (DBPSK, for example) modulation, the phase of a carrier wave ("θ" or "θ+π") is determined in accordance with a "change" between a bit value (0 or 1) transmitted previously and a bit value (0 or 1) to be transmitted next. In other words, in demodulating a DPSK signal in the receiver apparatus, data is regenerated by detecting a phase difference between the consecutive two bits.

An RZ (Return to Zero)-DPSK modulation, which further applies intensity modulation to the above DPSK signal in the transmitter apparatus and transmits the signal, is well known. The optical power of an RZ-DPSK signal is set low in a region where the phase of the carrier wave shifts, and thus, signal degradation caused by phase modulation is suppressed.

FIG. 1 is a diagram showing an example of a conventional receiver circuit for demodulating a DPSK signal. In FIG. 1, an interferometer (1-bit delaying interferometer) 101 comprises a 1-bit delaying element on one side of a pair of wave guides, and outputs a pair of optical signals in accordance with the phase difference between the consecutive two bits. A balanced photodiode 102 converts a pair of optical signals output from the interferometer 101 into an intensity-modulated signal. The output signal of the balanced photodiode 102 is amplified by an amplifier 103, and is further converted into an NRZ signal by a low-pass filter 104. Then, "0/1" data is acquired from the NRZ signal by an NRZ data Clock Data Recovery (CDR) circuit 105. RZ-DPSK modulation transmitter circuits and receiver circuits are described in, for example, Patent Documents 1-3. In Patent Document 4, a configuration using a Bang-Bang phase comparator is described as a common embodiment of the CDR circuit 105.

However, the CDR circuit described in Patent Document 4 requires a number of logic circuits and has difficulty in recovering high-speed data faster than 20 Gbps. The CDR circuit described in Patent Document 4, also, is not mass-produced due to its specific usage and therefore, is costly.

FIG. 2 is a diagram showing another example of a conventional receiver circuit for demodulating a DPSK signal. In FIG. 2, an input RZ-DPSK signal is split by an optical power splitter 111, and one is guided to the interferometer 101, and the other is guided to a photodiode 112. Here, the interferometer 101, the balanced photodiode 102, the amplifier 103, and the low-pass filter 104 are basically the same as explained with reference to FIG. 1. The photodiode 112 converts the RZ-DPSK signal into an electrical signal. This electrical signal is amplified by an amplifier 113, and further, its noise is removed by a band-pass filter 114. A flip-flop circuit 115 determines a logical value of the output signal of the low-pass filter 104 using the output signal of the band-pass filter 114 as a clock.

However, in this circuit, it is difficult to adjust to constantly keep the optimal phase difference when the data rate is high because the delay occurring between the optical power splitter 111 and the flip-flop circuit 115 is large. A problem of degradation in receiver sensitivity occurs under the circumstances.

[Patent Document 1]
Japanese laid-open unexamined patent publication No. 2001-251250 (Japanese Patent No. 3625726)

[Patent Document 2]
Japanese laid-open unexamined patent publication No. 2004-254242

[Patent Document 3]
US published application No. 2004/0081470

[Patent Document 4]
U.S. Pat. No. 5,012,494

SUMMARY OF THE INVENTION

It is an object of the present invention to provide an optical receiver circuit with a low-cost configuration for demodulating a high-speed RZ-DPSK signal with high sensitivity.

The RZ-DPSK optical receiver circuit of the present invention comprises an interferometer, comprising a 1-symbol delaying element in one of paired optical paths, for transmitting an input RZ-DPSK signal via the paired optical paths; a photo detector circuit for converting an optical signal output from said interferometer into an electrical signal; a high-pass filter with a cut-off frequency which is equal or approximately equal to the symbol rate of the RZ-DPSK signal, for filtering an output signal of said photo detector circuit; and a BPSK demodulator circuit for demodulating an output signal of said high-pass filter.

An input RZ-DPSK is converted into a pair of complementary intensity modulated optical signals by the interferometer (1-bit delaying interferometer). The intensity modulated optical signal is converted into an electrical signal by the photo detector circuit. The photo detector circuit outputs a signal (a differential signal) representing a difference between a pair of electrical signals corresponding to the pair of optical signals. The differential signal comprises NRZ intensity modulated component and BPSK modulated component. The high-pass filter removes frequency components lower than the symbol rate of the transmission data. As a result, the NRZ intensity modulated component is removed, and the BPSK signal is acquired. Consequently, the data can be recovered using the BPSK demodulator circuit.

Because the RZ-DPSK signal can be demodulated using a BPSK demodulator circuit, an optical receiver circuit with a simple and low-cost configuration can be achieved. Also by using the differential signal, receiver sensitivity can be improved.

BRIEF DESCRIPTION OF THE DRAWINGS

FIG. 4A and FIG. 4B are diagrams explaining the operation of the optical transmitter circuit;

FIG. 6 is a diagram showing a characteristic of a high-pass filter;

FIGS. 7A-FIG. 7C are diagrams explaining the operations of the optical receiver circuit;

FIG. 9A and FIG. 9B are diagrams showing a simulation result of the output signal of the high-pass filter

FIG. 14 is a diagram describing a configuration of an optical receiver circuit of the third embodiment.

DESCRIPTION OF THE PREFERRED EMBODIMENT

The optical receiver circuit of the present invention receives a DMPSK (Differential M Phase Shift Keying) signal, and demodulates the signal. Here, "M" is $2^n$ (n=1, 2, ... ). The DMPSK includes DBPSK (n=1) and DQPSK (n=2). In the following description, "DMPSK" is simply referred to as "DPSK". In the optical transmission system of the present invention, the DPSK signal is further modulated by RZ (Return to Zero) modulation before it is transmitted. In the following description, the DPSK signal modulated by the RZ modulation is referred to as "RZ-DPSK" signal.

Figure 1:
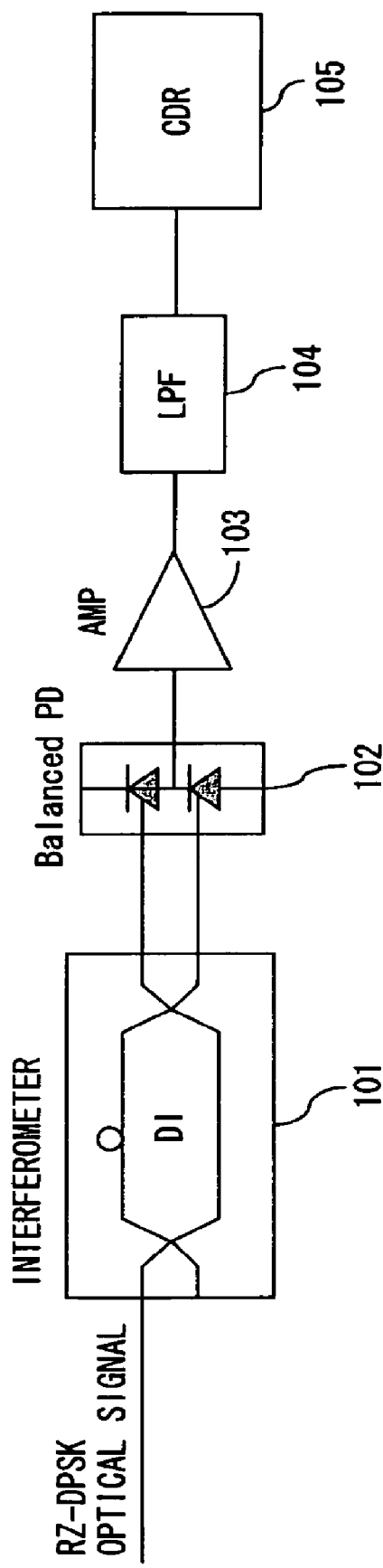
FIG. 1 is a diagram showing an example of a conventional receiver circuit for demodulating a DPSK signal.
Figure 2:
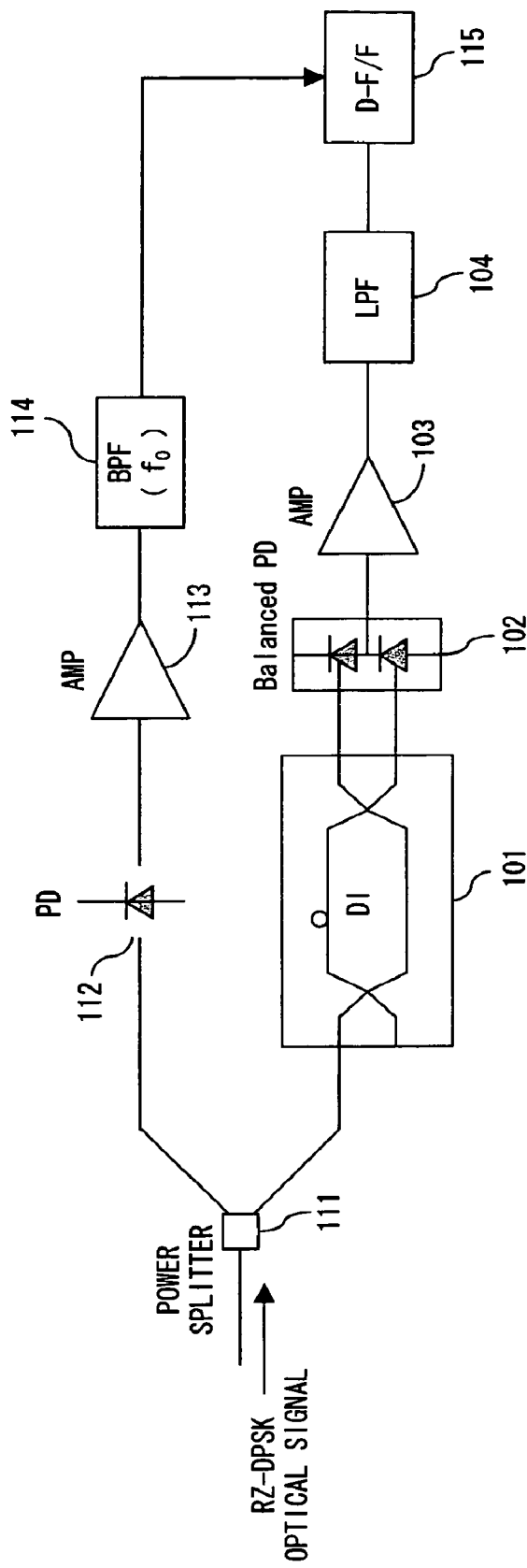
FIG. 2 is a diagram showing another example of a conventional receiver circuit for modulating a DPSK signal.
Figure 3:
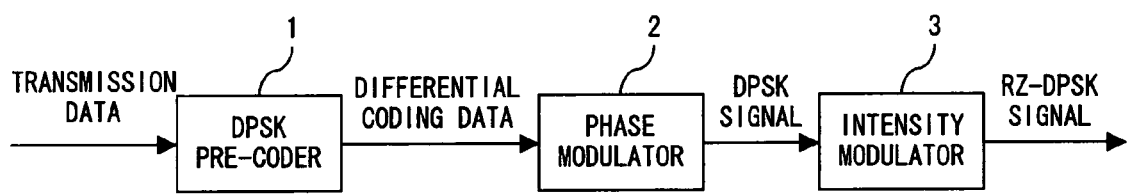
FIG. 3 is a diagram describing a configuration of an optical transmission circuit for generating an RZ-DPSK signal and for transmitting the signal.

FIG. 3 is a diagram describing a configuration of an optical transmitter circuit for generating an RZ-DPSK signal corresponding to transmission data and for transmitting the signal. In FIG. 3, a DPSK pre-coder 1 converts the transmission data into differential coding data. A phase modulator 2 generates a DPSK signal by, for example, phase modulation of CW (Continuous Wave) using the differential coding data. An intensity modulator 3 generates an RZ-DPSK signal by performing intensity modulation to the DPSK signal. The RZ-DPSK signal is, then, transmitted to an optical receiver apparatus via an optical fiber.

FIG. 4A and FIG. 4B are diagrams explaining the operation of the optical transmitter circuit. In the present embodiments, data is transmitted using DBPSK modulation. In the DBPSK modulation, 1-bit data is transmitted in one symbol, and thus the data rate and the symbol rate should be the same.

Each bit of the differential coding data is determined by "difference" between the previous adjacent bit data of a differential coding data and the corresponding bit data of the transmission data. In an example shown in FIG. 4A, for example, the d0th bit of the differential coding data is "1", and the s1$^{st}$ bit of the transmission data is "1". In other words, these two data bits match each other. In such a case, the d1$^{st}$ bit of the differential coding data is "1" in this embodiment.

Next, the d1$^{st}$ bit of the differential coding data is "1", and the s2$^{nd}$ bit of the transmission data is "0". In other words, these two data bits are different from each other. In such a case, the d2$^{nd}$ bit of the differential coding data is "0" in this embodiment.

The DPSK signal can be acquired by shifting the phase of the carrier wave using the differential coding data. In the example shown in FIG. 4A, when the differential coding data is "0", the phase of the carrier wave is set to "0", and when the differential coding data is "1", the phase of the carrier wave is set to "π". In other words, "0" or "π" is assigned for every bit in the DPSK signal.

RZ-DPSK signal is, as shown in FIG. 4B, acquired by lowering the optical power of the DPSK signal at every period corresponding to the bit rate (or the symbol rate) of the transmission data. Therefore, the optical power of the RZ-DPSK signal fluctuates at the same frequency as the bit rate (or the symbol rate) of the transmission data. The phase of the carrier wave is not changed by the RZ modulation. That is, the phase of each bit of the RZ-DPSK signal is "0" or "π".

Figure 5:
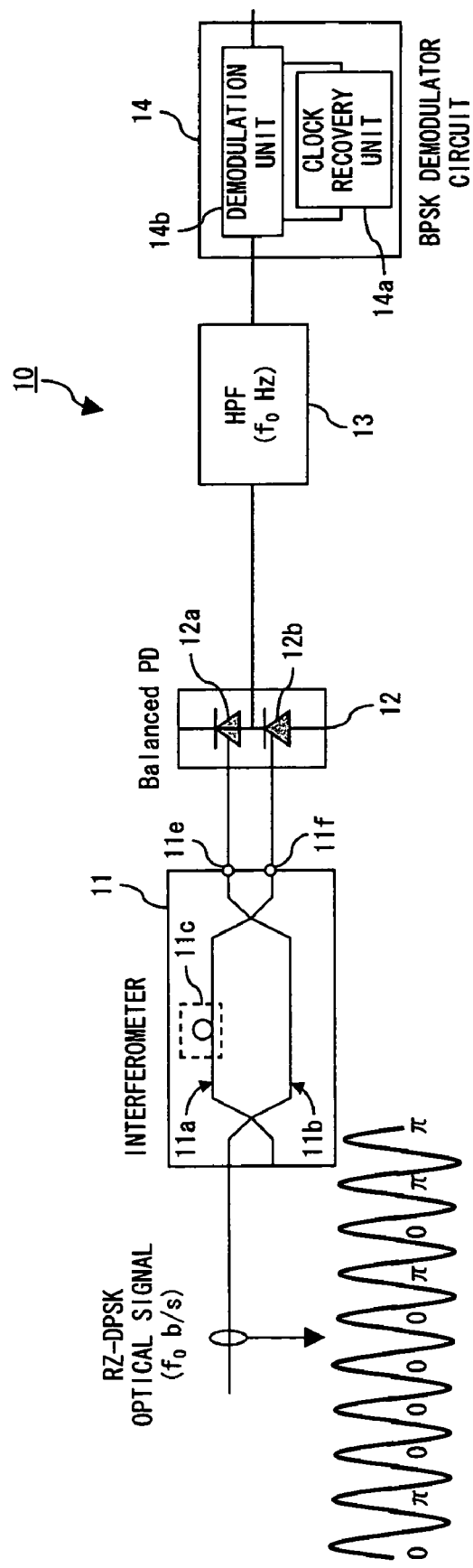
FIG. 5 is a diagram showing a configuration of the optical receiver circuit of the embodiments of the present invention.

FIG. 5 is a diagram showing a configuration of the optical receiver circuit of the embodiments of the present invention. An optical receiver circuit 10, shown in FIG. 5, receives the RZ-DPSK signal generated in such a manner as described above, and demodulates the signal. In the following description, the data to be received is DBPSK modulated data. The phase of each bit of the RZ-DPSK signal input to the optical receiver circuit 10 is "ππ0π0000π0 . . . ".

An interferometer (1-bit delaying interferometer) 11 is a Mach-Zehnder interferometer, for example, and comprises a 1-bit delaying element 11c in an upper arm 11a. The 1-bit delaying element 11c delays the RZ-DPSK signal by a time period corresponding to one bit of the transmission data. The 1-bit delaying element 11c can be, for example, realized by extending the optical path length of the upper arm 11a by a prescribed length, compared with a lower arm 11b.

A balanced photodiode (photo detector circuit) 12 is configured by comprising a pair of photodiodes 12a and 12b. The photodiode 12a generates electrical current corresponding to the optical signal output from an output port 11e of the interferometer 11. On the other hand, the photodiode 12b generates electrical current corresponding to the optical signal output from an output port 11f of the interferometer 11. The balanced photodiode 12 outputs a signal (differential reception signal) representing the difference between the currents generated by the photodiodes 12a and 12b.

A high-pass filter 13 performs filtering of the differential reception signal output from the balanced photodiode 12. Here, the cut-off frequency of the high-pass filter 13 is, as shown in FIG. 6, comparable to the data rate ($f_0$) of the transmission data. That is to say, the cut-off frequency of the high-pass filter 13 is equal or approximately equal to the data rate ($f_0$) of the transmission data. For example, when the speed of the transmission data is 20 Gbps, the cut-off frequency of the high-pass filter 13 is set to approximately 20 GHz. Thus, the high-pass filter 13 removes frequency components less than $f_0$ Hz from the differential reception signal. As a result, a BPSK signal corresponding to the transmission data is acquired. The reason why the BPSK signal is acquired is explained later.

A BPSK demodulator circuit 14 comprises a clock recovery unit 14a for recovering a clock, and a demodulation unit 14b for recovering the transmission data by demodulating the BPSK signal output from the high-pass filter 13. A circuit with the same configuration as a demodulator widely utilized in wireless receivers can be used as the BPSK demodulator circuit 14. Therefore, it is possible to reduce the size and the cost of the optical receiver circuit 10.

FIG. 7A though FIG. 7C are diagrams explaining the operations of the optical receiver circuit 10. In the operations, the RZ-DPSK signal shown in FIG. 7A is transmitted from transmitter apparatus and the optical receiver circuit 10 receives the RZ-DPSK signal via an optical fiber. The waveform shown in FIG. 7A represents the optical power of the RZ-DPSK signal. "0" and "π" represents the phase of the carrier wave of the RZ-DPSK signal.

The interferometer 11 comprises a 1-bit delaying element 11c. Thus, each bit of the RZ-DPSK signal, input to the interferometer 11, interferes the RZ-DPSK signal of the previous 1 bit. At that time, when the phase difference between the carrier waves of the RZ-DPSK signal, interfering with each other, is "0", an intensity modulation signal representing "1" is generated. On the other hand, when the phase difference between the carrier waves of the RZ-DPSK signal, interfering with each other is "π", an intensity modulation signal representing "0" is generated.

In an example shown in FIG. 7A, the phase of the carrier wave of the $0^{th}$ bit "π", and that of the $1^{st}$ bit is also "π". That is, the phase difference is "0". In such a case, the interferometer 11 outputs an optical signal representing "1", as shown in FIG. 7B. Next, the phase of the carrier wave of the $1^{st}$ bit is "π", and that of the $2^{nd}$ bit is "0". That is, the phase difference is "π". In such a case, the interferometer 11 outputs an optical signal representing "0". Hereinafter, optical signals corresponding to the phase differences of the carrier wave for each bit are output from the interferometer 11 in the manner described above.

The optical signal output from the interferometer 11 is an intensity modulation signal representing "100011100 . . . ". In other words, the optical signal output from the interferometer 11 is an RZ-intensity modulation signal representing the transmission data shown in FIG. 4A. The interferometer 11 outputs a pair of complementary optical signals via the output port 11e and the output port 11f.

The balanced photodiode 12 outputs a signal (a differential reception signal) representing the difference between the electrical current corresponding to the optical signal output from the output port 11e of the interferometer 11 and the electrical current corresponding to the optical signal output from the output port 11f of the interferometer 11. Here, the interferometer 11 outputs a pair of complementary optical signals. Therefore, the voltage waveform of the differential reception signal becomes the one shown in FIG. 7C. That is, when the output of the interferometer 11 is "1", a waveform with a prescribed amplitude centering "A (a positive value)" is acquired. On the other hand, when the output of the interferometer 11 is "0", a waveform with the prescribed amplitude centering "−A" is acquired. As a result, the differential reception signal generated by the balanced photodiode 12 comprises an NRZ intensity modulation component, which is dependent on a logical value (0 or 1) of each bit. When the logical value (0 or 1) of each bit changes, a clock phase of the differential reception signal inverts (In other words, the phase shifts by π). That is, the differential reception signal comprises a BPSK modulation component, in which the clock phase inverts in accordance with the logical value (0 or 1) of each bit.

Figure 8A:
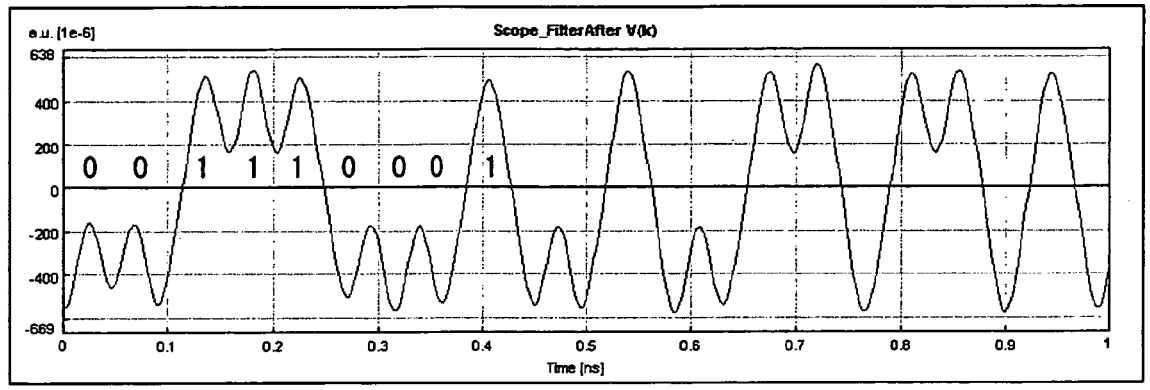
FIG. 8A and FIG. 8B are diagrams showing a simulation result of the output signal of the balanced photodiode.
Figure 8B:
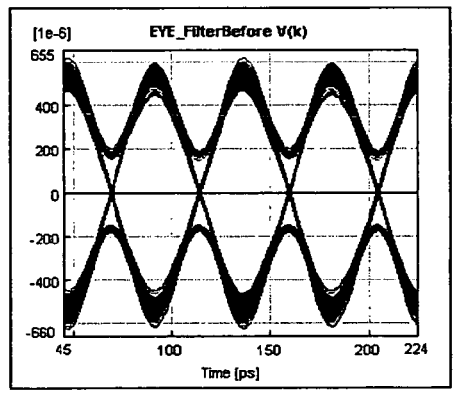

FIG. 8A and FIG. 8B are diagrams showing a simulation result of the output signal of the balanced photodiode 12. FIG. 8A shows the waveform of the differential reception signal, and FIG. 8B shows an eye pattern of the differential reception signal. As shown in FIG. 8A and FIG. 8B, the differential reception signal comprises an NRZ intensity modulation component, which is dependent on the logical value (0 or 1) of each bit and a BPSK modulation component, in which the clock phase inverts in accordance with the logical value of each bit.

The differential reception signal generated in the way described above is filtered by the high-pass filter 13. In this case, the cut-off frequency of the high-pass filter 13 is, as shown in FIG. 6, comparable to the data rate ($f_0$) of the transmission data. In other words, the high-pass filter 13 removes frequency components lower than $f_0$ Hz from the differential reception signal.

FIG. 9A and FIG. 9B are diagrams showing a simulation result of the output signal of the high-pass filter 13. FIG. 9A shows a waveform of the signal and FIG. 9B shows an eye pattern.

The comparison between the signal waveforms in FIG. 8A and FIG. 9A reveals that an NRZ amplitude modulation component is removed from the differential reception signal by the high-pass filter 13. This attributes the fact that most of the NRZ intensity modulation spectrum is present in a frequency region lower than the data rate ($f_0$) of the transmission data.

The phase of the output signal of the high-pass filter 13 shifts by "π" when the logical value of the differential reception signal changes. In other words, if the phase of the output signal of the high-pass filter 13 is "θ" when the differential reception signal is "1", then, the phase of the output signal of the high-pass filter 13 is "θ+π" when the differential reception signal is "0". That is, the BPSK modulation components remains in the output signal of the high-pass filter 13. This attributes the fact that the BPSK modulation spectrum is present centering the data rate ($f_0$) of the transmission data.

The differential reception signal, as described above, is converted into a BPSK signal by the filtering of the high-pass filter 13. Thus, the transmission data can be recovered if the output signal of the high-pass filter 13 is demodulated by the BPSK demodulator circuit.

Figure 10:
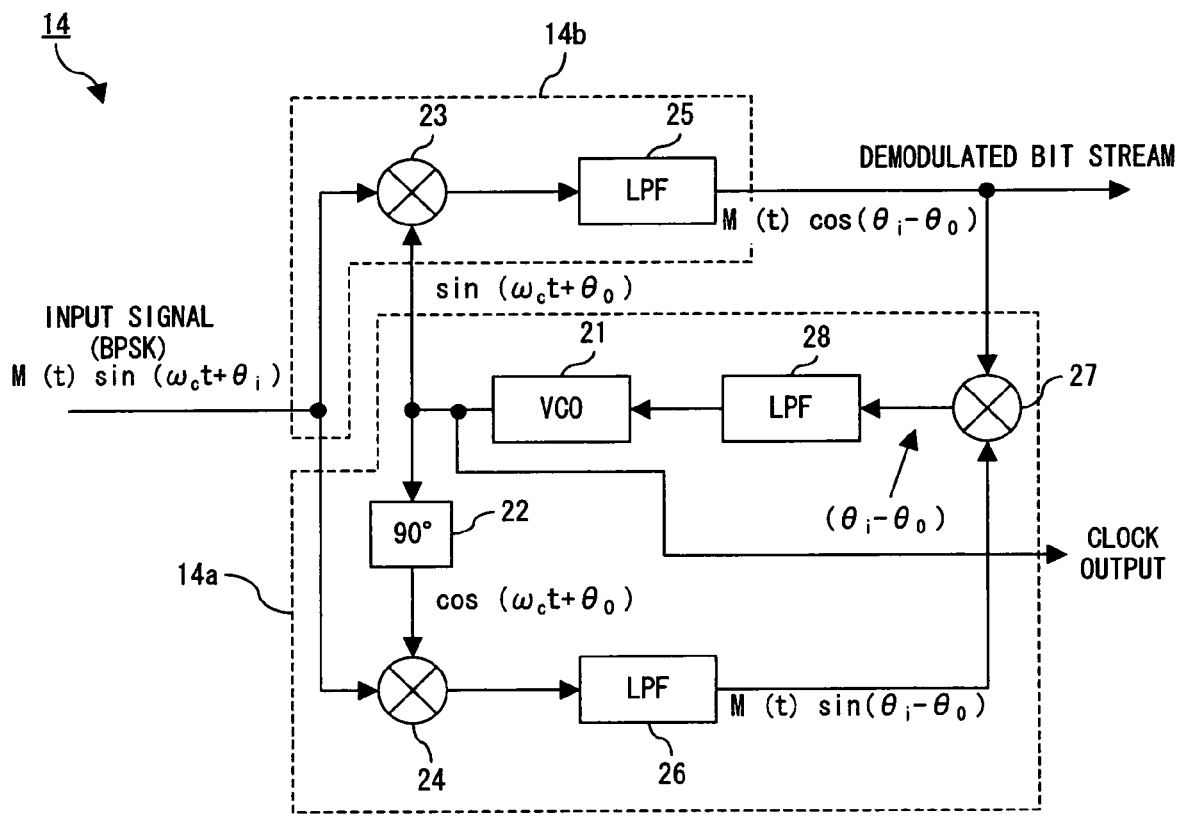
FIG. 10 is a diagram showing a configuration of the BPSK demodulator circuit.

FIG. 10 is a diagram showing a configuration of the BPSK demodulator circuit 14. In this description, the BPSK demodulator circuit 14 demodulates a signal output from the high-pass filter 13.

A voltage Control Oscillator (VCO) 21 generates a clock signal. The frequency of the clock signal changes according to the control voltage provided from a low-pass filter 28. A phase shifter 22 shifts the phase of the clock signal generated by the VCO 21 by 90 degrees. By so doing, a pair of clock signals (sine wave clock signal and cosine wave clock signal), which are orthogonal to each other, is acquired.

A multiplier 23 multiplies the input signal by the sine wave clock signal. A multiplier 24 multiplies the input signal by the cosine wave clock signal. Low-pass filters 25 and 26 filter the output signals of the multipliers 23 and 24, respectively. A multiplier 27 multiplies the output signals from the low-pass filter 25 and that from the low-pass filter 26. The low-pass filter 28 generates the control voltage by smoothing the output of the multiplier 27, and provides the control voltage to the VCO 21.

In the BPSK demodulator circuit with the above configuration, when a feedback control is performed so that the output of the multiplier 27 ($θ_i$-$θ_0$) is zero, for example, the frequency of the clock signal matches with the frequency of the input signal. In other words, the clock is recovered. In this case, the output of the low-pass filter 25 is a demodulated bit stream (recovered transmission data).

The BPSK demodulator circuit 14, in such a manner, can recover the clock and the transmission data by demodulating the signal output from the high-pass filter 13.

The BPSK demodulator circuit shown in FIG. 10 is a circuit widely used in wireless receivers, and its configuration and operation are known. If such a widely used circuit is utilized as the BPSK demodulator circuit 14, it is possible to reduce the cost of the optical receiver circuit 10. In addition, a simple circuit configuration of the above BPSK circuit contributes to reduce the size of the optical receiver circuit 10.

The optical receiver circuit of the present invention, as described above, converts an RZ-DPSK signal into a BPSK signal using an interferometer, a balanced photodiode and a high-pass filter, and demodulates the BPSK signal by using a BPSK demodulator circuit. Here, in the configuration, which detects an optical signal using a balanced photodiode, as it is widely known, the sensitivity is improved by 3 dB, compared with a configuration, which detects an optical signal using one photodiode. Therefore, according to the present invention, it is possible to demodulate a high-speed RZ-DPSK signal with high sensitivity by a low-cost configuration.

First Embodiment

Figure 11:
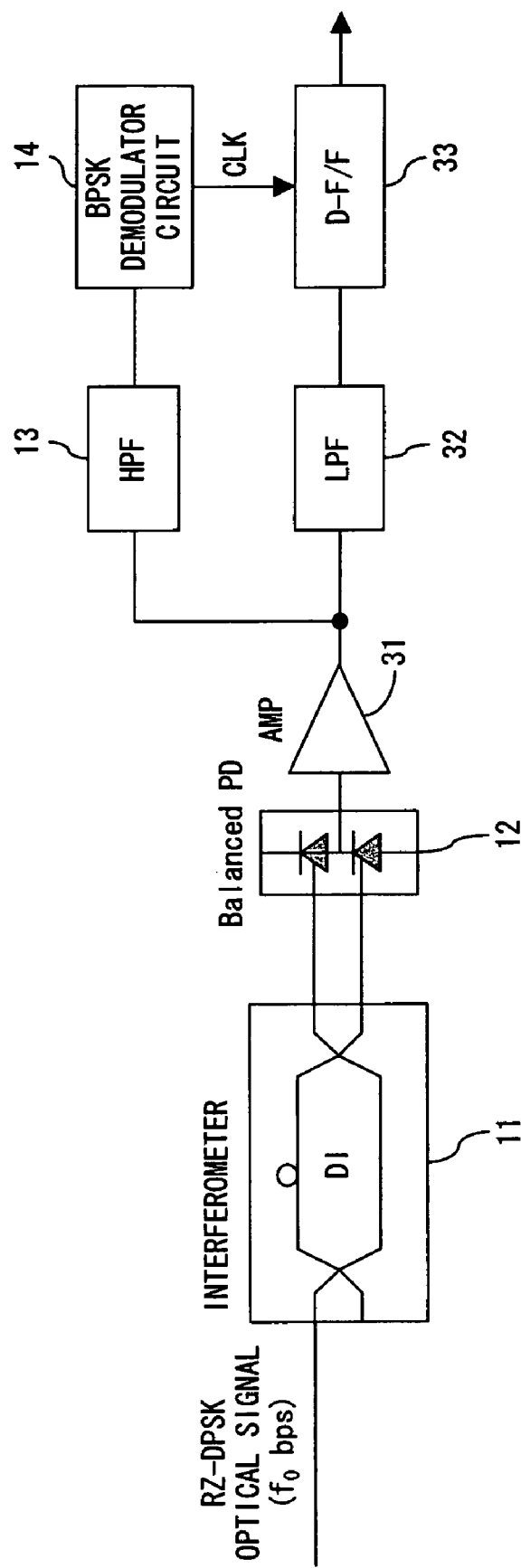
FIG. 11 is a diagram describing a configuration of an optical receiver circuit of the first embodiment.

FIG. 11 is a diagram showing a configuration of an optical receiver circuit of the first embodiment. The interferometer 11, the balanced photodiode 12, the high-pass filter 13 and the BPSK demodulator circuit 14 can be the same as the above.

An amplifier 31 is provided between the balanced photodiode 12 and the high-pass filter 13, and amplifies the differential reception signal acquired by the balanced photodiode 12. By providing the amplifier 31, the receiver sensitivity is improved.

A low-pass filter 32 filters the differential reception signal amplified by the amplifier 31. The cut-off frequency of the low-pass filter 32 is about 70 percent of the data rate ($f_0$) of the transmission data, for example. By providing the low-pass filter 32, the noise is removed and the waveform is improved.

A determination circuit 33 is a D flip-flop, for example, and determines the logical value of the output signal of the low-pass filter 32 at rising edge timing of a clock signal generated by the BPSK demodulator circuit 14. That is, when the output signal of the low-pass filter 32 exceeds a threshold, "1" is output, and the output signal of the low-pass filter 32 is less than the threshold, "0" is output. At that time, the output of the determination circuit 33 is the recovered transmission data. The clock signal fed to the determination circuit 33 is generated by the VCO 21 in FIG. 10.

In such a configuration, the BPSK demodulator circuit 14 operates in order to recover the clock signal. The determination circuit 33 determines the logical value of the NRZ signal shaped in the low-pass filter 32 using the above clock signal. In short, a circuit for recovering a clock and a circuit for determining data are both electrical circuits, and therefore, the phases of the clock and the data can be easily matched.

Second Embodiment

Figure 12:
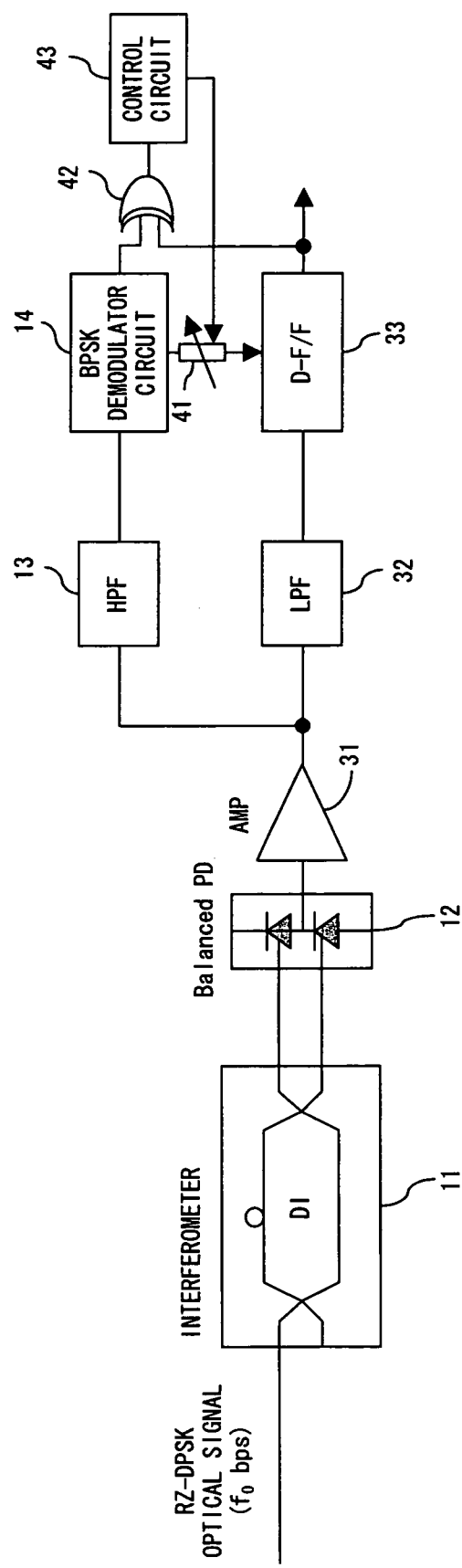
FIG. 12 is a diagram describing a configuration of an optical receiver circuit of the second embodiment.

FIG. 12 is a diagram describing a configuration of an optical receiver circuit of the second embodiment. The interferometer 11, the balanced photodiode 12, the high-pass filter 13, the BPSK demodulator circuit 14, the amplifier 31, the low-pass filter 32 and the determination circuit 33 can be the same as explained above.

A variable delaying circuit 41 delays a clock signal provided from the BPSK demodulator circuit 14 to the determination circuit 33. The delay created by the variable delaying circuit 41 is adjusted by a control signal generated by a control circuit 43. An exclusive OR circuit 42 performs exclusive OR operation of data stream output from the BPSK demodulator circuit 14 and data stream output from the determination circuit 33. The control circuit 43 generates a control signal for adjusting the delay of the variable delaying circuit 41 based on the exclusive OR data.

Figure 13:
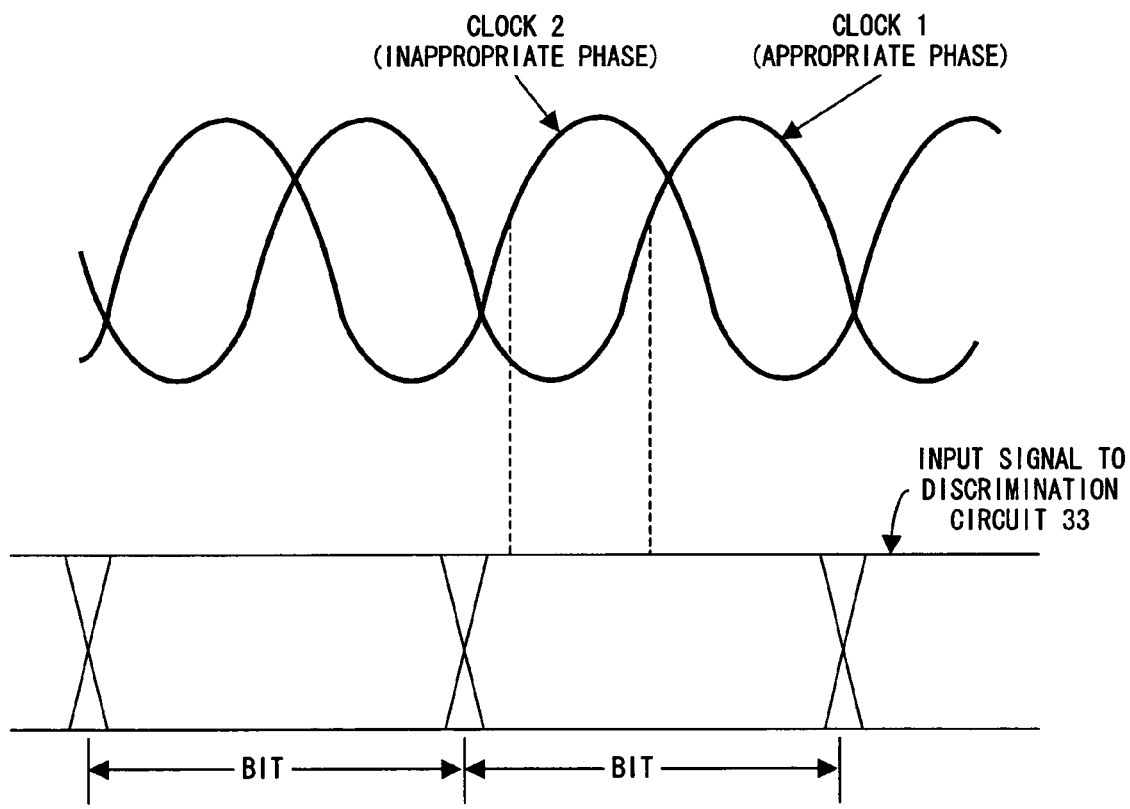
FIG. 13 is a diagram describing an operation of an optical receiver circuit of the second embodiment.

In the optical receiver with the above configuration, when the phase of a clock signal acquired from the BPSK demodulator circuit 14 is set so as to be appropriate to the phase of an input signal of the determination circuit 33, the data output from the determination circuit 33 can be accurately recovered. For example, the rising edge of the clock signal 1, in FIG. 13, lies in the center of each bit of a signal input to the determination circuit 33, and therefore the determination circuit 33 can recover the data accurately. However, the rising edge of the clock signal 2 lies around the edge of each bit of a signal input to the determination circuit 33. In such a case, there is a possibility that the logical value of the data can be determined inaccurately.

The optical receiver circuit of the second embodiment comprises a function to dynamically adjust the phase of the clock signal described above. The data output from the determination circuit 33 is accurately recovered if the phase of the clock signal provided from the BPSK demodulator circuit 14 to the determination circuit 33 is appropriate. In other words, when the phase of the clock signal is appropriate, the data output from the BPSK demodulator circuit 14 and the data output from the determination circuit 33 should match with each other. When the data output from the BPSK demodulator circuit 14 and the data output from the determination circuit 33 match with each other, the output of the exclusive OR circuit 42 is "0". Therefore, the control circuit 43 performs feedback control on the delay of the variable delaying circuit 41 so that the average value of the output of the exclusive OR circuit 42 approaches "0", or the value of the output of the exclusive OR circuit 42 is minimized. By so doing, the phase of the clock signal is optimized for the phase of the input signal of the determination circuit 33, and thus, bit errors in recovering the transmission data is reduced.

Third Embodiment

FIG. 14 is a diagram showing a configuration of an optical receiver circuit of the third embodiment. The interferometer 11, the balanced photodiode 12, the high-pass filter 13, the BPSK demodulator circuit 14, the amplifier 31, the low-pass filter 32, the determination circuit 33, and the exclusive OR circuit 42 can be the same as explained above.

A limiter amplifier 51 amplifies the output signal of the low-pass filter 32 to a prescribed limit value, using a dynamically adjustable determination point (a threshold level). As the determination point changes, the waveform of the output signal of the limiter amplifier 51 also changes accordingly. The determination circuit 33 determines the logical value of the signal amplified by the limiter amplifier 51 using the clock signal provided from the BPSK demodulator circuit 14. A control circuit 52 controls the determination point of the limiter amplifier 51 based on the output of the exclusive OR circuit 42. At that time, when the data is accurately recovered in the determination circuit 33, as described above, the output of the exclusive OR circuit 42 is "0". The control circuit 52, therefore, performs feedback control on the determination point of the limiter amplifier 51 so that the average value of the output of the exclusive OR circuit 42 approaches "0", or the average value of the output of the exclusive OR circuit 42 is minimized. By so doing, reduction in bit errors is expected.

If it is possible to adjust the threshold for determining the logical value of the data dynamically in the determination circuit 33, the threshold may be controlled by the feedback control using the control signal from the control circuit 52 so that the data error rate reaches the minimum. In addition, if it is possible to dynamically adjust the limit level of the limiter amplifier 51, the limit level may be controlled by the feedback control using the control signal from the control circuit 52 so that the data error rate reaches the minimum.

In the optical receiver circuits of the above first through the third embodiments, reception characteristics may be monitored using the output of the BPSK demodulator circuit 14 and the determination circuit 33. As the reception characteristics, for example, error rate can be detected by monitoring the ratio of different bits between the data output from the BPSK demodulator circuit 14 and the data output from the determination circuit 33. In this case, a circuit for monitoring the reception characteristics operates in synchronization with the clock signal generated by the BPSK demodulator circuit 14.

Fourth Embodiment

Figure 15:
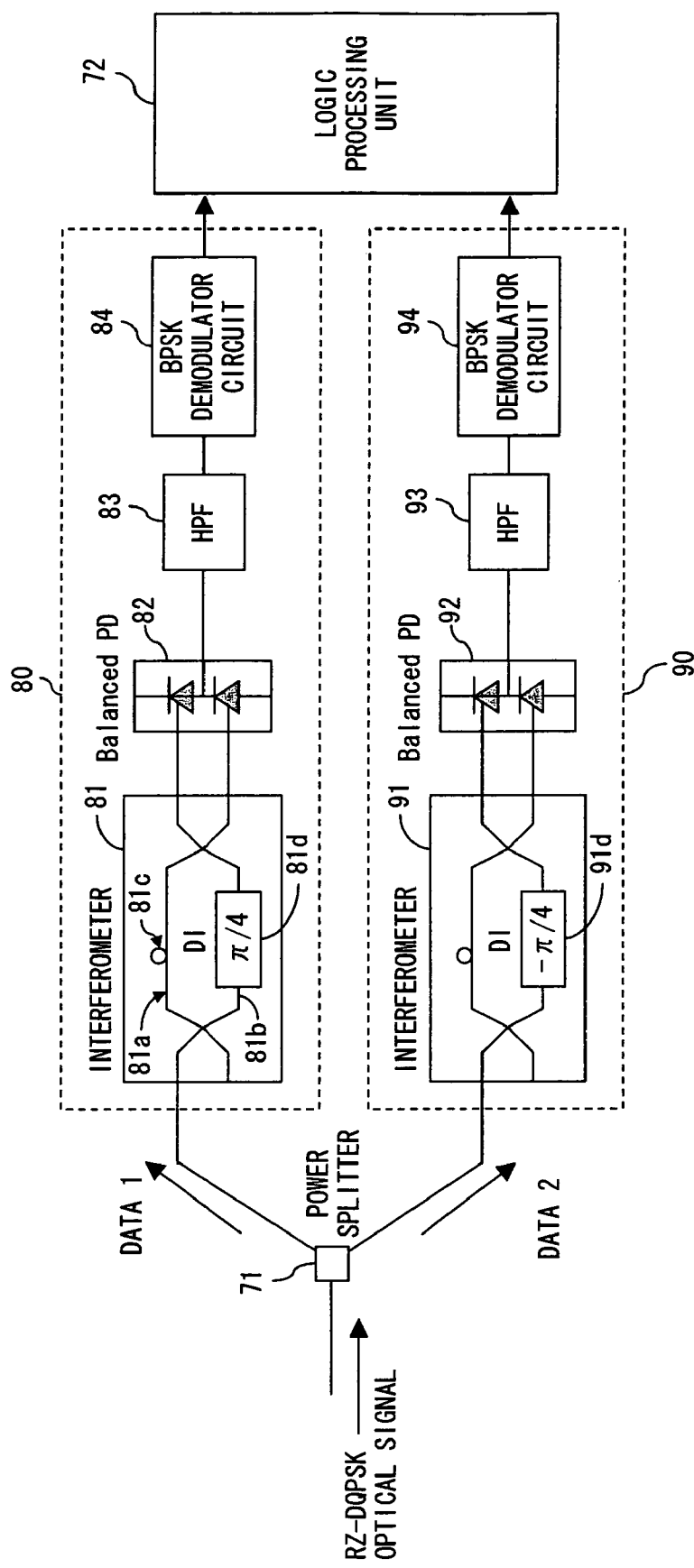
FIG. 15 is a diagram describing a configuration of an optical receiver circuit of the fourth embodiment.

FIG. 15 is a diagram showing a configuration of an optical receiver circuit of the fourth embodiment. The optical receiver circuit in the fifth embodiment receives the RZ-DQPSK signal and demodulates it.

In FIG. 15, an optical power splitter 71 splits the received RZ-DQPSK signal. A pair of RZ-DQPSK signals acquired by the optical power splitter 71 is guided to a receiver circuit 80 or a receiver circuit 90.

The receiver circuit 80 comprises an interferometer 81, a balanced photodiode 82, a high-pass filter 83, and a BPSK demodulator circuit 84, and demodulates the RZ-DQPSK signal (#1). Here, configurations and operations of the interferometer 81, the balanced photodiode 82, the high-pass filter 83, and the BPSK demodulator circuit 84 are basically the same as those of the above described interferometer 11, balanced photodiode 12, high-pass filter 13, and BPSK demodulator circuit 14.

However, the interferometer 81 comprises a 1-symbol delaying element 81c in an upper arm 81a, and a $\pi/4$ phase shifter 81d in a lower arm 81b. The 1-symbol delaying element 81c delays the RZ-DQPSK signal by the time period of one symbol. In QPSK, two bits of data are transmitted in one symbol, and therefore the one symbol time period is twice as long as the one bit time period of the transmission data. The $\pi/4$ phase shifter 81d shifts the phase of the carrier wave of the RZ-DQPSK signal by "$\pi/4$" (or $\pi/4 + 2n\pi$, where n is an integer).

A cut-off frequency of the high-pass filter 83 is comparable to the symbol rate of the RZ-DQPSK signal. For example, when the speed of the transmission data is 40 Gbps (that is, 20 G symbol/second), the cut-off frequency of the high-pass filter 83 is set to approximately 20 GHz.

The receiver circuit 90 comprises an interferometer 91, a balanced photodiode 92, a high-pass filter 93, and a BPSK demodulator circuit 94, and demodulates the RZ-DQPSK signal (#2). Here, configurations and operations of the interferometer 91, the balanced photodiode 92, the high-pass filter 93, and the BPSK demodulator circuit 94 are basically the same as those of the above described interferometer 81, balanced photodiode 82, high-pass filter 83, BPSK demodulator circuit 84. However, the interferometer 91 comprises a $-\pi/4$ phase shifter 91d instead of the $\pi/4$ phase shifter 81d. The $-\pi/4$ phase shifter 91d shifts the phase of the carrier wave of the RZ-DQPSK signal by "$-\pi/4$ (or $-\pi/4 - 2n\pi$ where n is an integer)".

A logic processing unit 72 regenerates the transmission data by multiplexing a pair of demodulated data (DATA 1 and DATA 2) acquired by the BPSK demodulator circuit 84 and the BPSK demodulator circuit 94. At that time, the logic processing unit 72 adjusts the bit order of the data stream and performs necessary operation when multiplexing the DATA 1 and the DATA 2. In such a manner, the optical receiver circuit of the fourth embodiment is able to demodulate the RZ-DQPSK signal using a pair of BPSK receiving circuits. As each of the receiver circuits 80 and 90 of the optical receiver circuit of the fourth embodiment, it is possible to introduce the configurations in the first through the third embodiment.

In the embodiment described above, frequency components lower than the bit rate or the symbol rate is removed from the output signal of the balanced photodiode, using the high-pass filter 13; however, the present invention is not limited to the configuration. In other words, the function of the high-pass filter 13 may be realized by other circuits. For example, as the amplifier 31, the function equivalent to the high-pass filter 13 can be realized by using an amplifier with sufficiently small gain (or no gain) in the frequency range lower than the bit rate or the symbol rate. Also, as the BPSK demodulator circuit 14, the equivalent function as the high-pass filter 13 can be acquired by introducing a configuration that the circuit does not operate in a frequency range lower than the bit rate or the symbol rate.

What is claimed is:

1. A RZ-DPSK optical receiver circuit comprising:
   an interferometer, comprising a 1-symbol delaying element in one of paired optical paths, for transmitting an input RZ-DPSK signal via the paired optical paths;
   a photo detector circuit for converting an optical signal output from said interferometer into an electrical signal;
   a high-pass filter with a cut-off frequency which is equal or approximately equal to the symbol rate of the RZ-DPSK signal, for filtering an output signal of said photo detector circuit; and
   a BPSK demodulator circuit for demodulating an output signal of said high-pass filter, wherein
   said interferometer outputs a pair of complementary optical signals, and
   said photo detector circuit comprises a pair of photodiodes for respectively converting the pair of the optical signals into a pair of electrical signals and outputs a differential signal of the pair of electrical signals acquired by the pair of photodiodes, and
   said high-pass filter acquires a BPSK signal from the differential signal, and
   said BPSK demodulator circuit demodulates the BPSK signal.

2. The RZ-DPSK optical receiver circuit according to claim 1, further comprising
   an amplifier, provided between said photo detector circuit and said high-pass filter, for amplifying an output signal of said photo detector circuit.

3. The RZ-DPSK optical receiver circuit according to claim 1, wherein the BPSK demodulator circuit comprises:
   an oscillator circuit for generating a pair of clock signals, which are orthogonal to each other;
   a pair of multipliers for multiplying the output signal of said high-pass filter and the pair of clock signals; and
   a control circuit for controlling the frequency of the clock signal generated by the oscillator circuit based on the outputs of the pair of multipliers.

4. The RZ-DPSK optical receiver circuit according to claim 1, further comprising
   a determination circuit for determining a logical value of data in response to voltage of the output signal of said photo detector circuit, using the clock signal recovered by said BPSK demodulator circuit.

5. The RZ-DPSK optical receiver circuit according to claim 4, further comprising
a low-pass filter, provided in the preceding stage of said determination circuit, for filtering the output signal of said photo detector circuit.

6. The RZ-DPSK optical receiver circuit according to claim 4, further comprising:
a control circuit for generating a control signal in response to the comparison result between data acquired from said BPSK demodulator circuit and data acquired by said determination circuit; and
an adjustment circuit for adjusting a phase of a clock signal provided from said BPSK demodulator circuit to said determination circuit in accordance with the control signal.

7. The RZ-DPSK optical receiver circuit according to claim 4, further comprising:
a limiter amplifier, provided in the preceding stage of said determination circuit, for amplifying an output signal of said photo detector circuit; and
a control circuit for generating a control signal in response to a comparison result between data acquired from said BPSK demodulator circuit and data acquired from said determination circuit, wherein
the limiter amplifier amplifies the output signal of said photo detector circuit in accordance with the control signal.

8. A RZ-DPSK optical receiver circuit, comprising:
an interferometer, comprising a 1-symbol delaying element in one of paired optical paths, for transmitting an input RZ-DPSK signal via the paired optical paths;
a photo detector circuit for converting an optical signal output from said interferometer into an electrical signal;
removing means for removing frequency component lower than the symbol rate of the RZ-DPSK optical signal from the output signal of said photo detector circuit; and
a BPSK demodulator circuit for demodulating the signal, whose frequency component lower than the symbol rate being removed by said removing means, wherein
said interferometer outputs a pair of complementary optical signals, and
said photo detector circuit comprises a pair of photodiodes for respectively converting the pair of the optical signals into a pair of electrical signals and outputs a differential signal of the pair of electrical signals acquired by the pair of photodiodes, and
said removing means acquires a BPSK signal from the differential signal, and
said BPSK demodulator circuit demodulates the BPSK signal.

9. The RZ-DPSK optical receiver circuit according to claim 8, wherein
said removing means is an amplifier, which has zero or sufficiently small gain in the frequency range lower than the symbol rate, for amplifying the output signal of said photo detector circuit.

10. A RZ-DQPSK optical receiver circuit, comprising:
an optical splitter for generating first and second RZ-DQPSK signals by splitting a RZ-DQPSK signal;
a first interferometer, comprising a 1-symbol delaying element in one of a pair of optical paths and a phase shifter for shifting the phase of a carrier wave of the first RZ-DQPSK signal by $\pi/4$ in the other optical path of the pair, for transmitting the first RZ-DQPSK signal via the pair of the optical paths;
a first photo detector circuit for converting an optical signal output from said first interferometer into an electrical signal;
a first high-pass filter with a cut-off frequency which is equal or approximately equal to the symbol rate of the RZ-DQPSK optical signal, for filtering the output signal of said first photo detector circuit;
a first BPSK demodulator circuit for demodulating the output signal of said first high-pass filter;
a second interferometer, comprising a 1-symbol delaying element in one of a pair of optical paths and a phase shifter for shifting the phase of a carrier wave of the first RZ-DQPSK signal by $-\pi/4$ in the other optical path of the pair, for transmitting the second RZ-DQPSK signal via the pair of the optical paths;
a second photo detector circuit for converting an optical signal output from said second interferometer into an electrical signal;
a second high-pass filter with a cut-off frequency which is equal or approximately equal to the symbol rate of the RZ-DQPSK optical signal, for filtering the output signal of said second photo detector circuit;
a second BPSK demodulator circuit for demodulating the output signal of said second high-pass filter; and
a signal processing circuit for regenerating data stream from the output of said first and second BPSK demodulator circuits, wherein
said first interferometer outputs a pair of complementary optical signals, and
said first photo detector circuit comprises a pair of photodiodes for respectively converting the pair of the optical signals into a pair of electrical signals and outputs a first differential signal of the pair of electrical signals acquired by the pair of photodiodes, and
said first high-pass filter acquires a first BPSK signal from the first differential signal, and
said first BPSK demodulator circuit demodulates the first BPSK signal, and
said second interferometer outputs a pair of complementary optical signals, and
said second photo detector circuit comprises a pair of photodiodes for respectively converting the pair of the optical signals into a pair of electrical signals and outputs a second differential signal of the pair of electrical signals acquired by the pair of photodiodes, and
said second high-pass filter acquires a second BPSK signal from the second differential signal, and
said second BPSK demodulator circuit demodulates the second BPSK signal.

* * * * *